(12) United States Patent
Hansen, Jr. et al.

(10) Patent No.: US 11,678,412 B1
(45) Date of Patent: Jun. 13, 2023

(54) METHOD FOR DETERMINING ELECTRODE CONSUMPTION WITH MACHINE VISION

(71) Applicant: AMI International, S. De R.L. De C.V, Monterrey (MX)

(72) Inventors: James Jesse Hansen, Jr., Brecksville, OH (US); Eric Garza Sanchez, Monterrey (MX); Mariana Viale, Monterrey (MX)

(73) Assignee: AMI International, S. De R.L. De C.V, Monterrey (MX)

( * ) Notice: Subject to any disclaimer, the term of this patent is extended or adjusted under 35 U.S.C. 154(b) by 538 days.

(21) Appl. No.: 16/808,051

(22) Filed: Mar. 3, 2020

Related U.S. Application Data

(60) Provisional application No. 62/813,205, filed on Mar. 4, 2019.

(51) Int. Cl.
| | |
|---|---|
| *H05B 7/101* | (2006.01) |
| *C21C 5/52* | (2006.01) |
| *F27B 3/08* | (2006.01) |

(52) U.S. Cl.
CPC ............... *H05B 7/101* (2013.01); *C21C 5/52* (2013.01); *F27B 3/085* (2013.01)

(58) Field of Classification Search
CPC .......... H05B 7/06; H05B 7/101; H05B 7/109; H05B 7/148; H05B 31/08; H05B 7/10; F27D 11/10; C21C 5/52; F27B 3/085
(Continued)

(56) References Cited

U.S. PATENT DOCUMENTS

| | | |
|---|---|---|
| 4,852,120 A | 7/1989 | Udo |
| 5,099,438 A | 3/1992 | Gulden, Jr. et al. |

(Continued)

FOREIGN PATENT DOCUMENTS

| | | | | |
|---|---|---|---|---|
| EP | 1558062 | * | 7/2005 | ............... H05B 7/06 |

OTHER PUBLICATIONS

Vicente, Asier; Gutierrez, J. A.; Arteche, Jose Antonio; Macaya, I., Liquid Steel Level Measurement at Electric Arc Furnaces without Increasing the Power Off Time [Online], European Steelmaking Conference and Expo, May 11, 2016. Retrieved from the Internet: <www.researchgate.net/publication/318942296_liquid_steel_level_measurement_at_electric_arc_furnaces_without_increasing_the_power_off_time>.

(Continued)

*Primary Examiner* — Scott R Kastler
*Assistant Examiner* — Michael Aboagye
(74) *Attorney, Agent, or Firm* — Creativenture Law, LLC; Dennis J M Donahue, III; Kevin Staed

(57) ABSTRACT

A system and method for monitoring consumption of graphite electrodes during the operation of an electric arc furnace (EAF) uses machine vision cameras operatively communicating with a computer processor. The system can determine, track, manage, and optimize the consumption of the graphite electrodes in real time. Electrode consumption is determined for each EAF heat by measuring the length and tip diameter of the electrode. The length and tip diameter are used to determine the electrode consumption amount using a consumption model. Measured hydraulic pressure within the EAF correlating with a known electrode weight can also be used to determine electrode consumption and correlated with the model calculation. Butt loss can also be determined based on the machine vision measured lengths of the electrode and/or based on the hydraulic pressure. The calculated (Continued)

electrode consumption amounts are also stored in a database and correlated to other measured EAF parameters for multiple EAFs.

19 Claims, 9 Drawing Sheets

(58) Field of Classification Search
USPC .......... 373/88, 50, 105, 106, 52, 53, 54, 94; 219/124.1; 702/34
See application file for complete search history.

(56) References Cited

U.S. PATENT DOCUMENTS

| | | | |
|---|---|---|---|
| 5,204,872 A | | 4/1993 | Staid et al. |
| 5,539,768 A | | 7/1996 | Kracich |
| 6,804,582 B1 | * | 10/2004 | Gerhan .................. F27B 3/28 |
| | | | 373/88 |
| 6,934,039 B2 | | 8/2005 | Rincon et al. |
| 7,991,039 B2 | | 8/2011 | Gerhan et al. |
| 9,439,247 B2 | * | 9/2016 | Ingersoll, III ............ F27B 3/28 |
| 9,784,500 B2 | | 10/2017 | Barker et al. |
| 2020/0355436 A1 | * | 11/2020 | Toniolo .................. F27D 19/00 |

OTHER PUBLICATIONS

Potey, Didier; Bowman, Ben; Alameddine, Said, Electrode Consumption Model Update 2004, Eighth European Electric Steelmaking Conference, 2005. Retrieved from the Internet: <www.tib.eu/en/search/id/BLCP%3ACN065246350/Electrode-Consumption-Model-Update-2004/>.

* cited by examiner

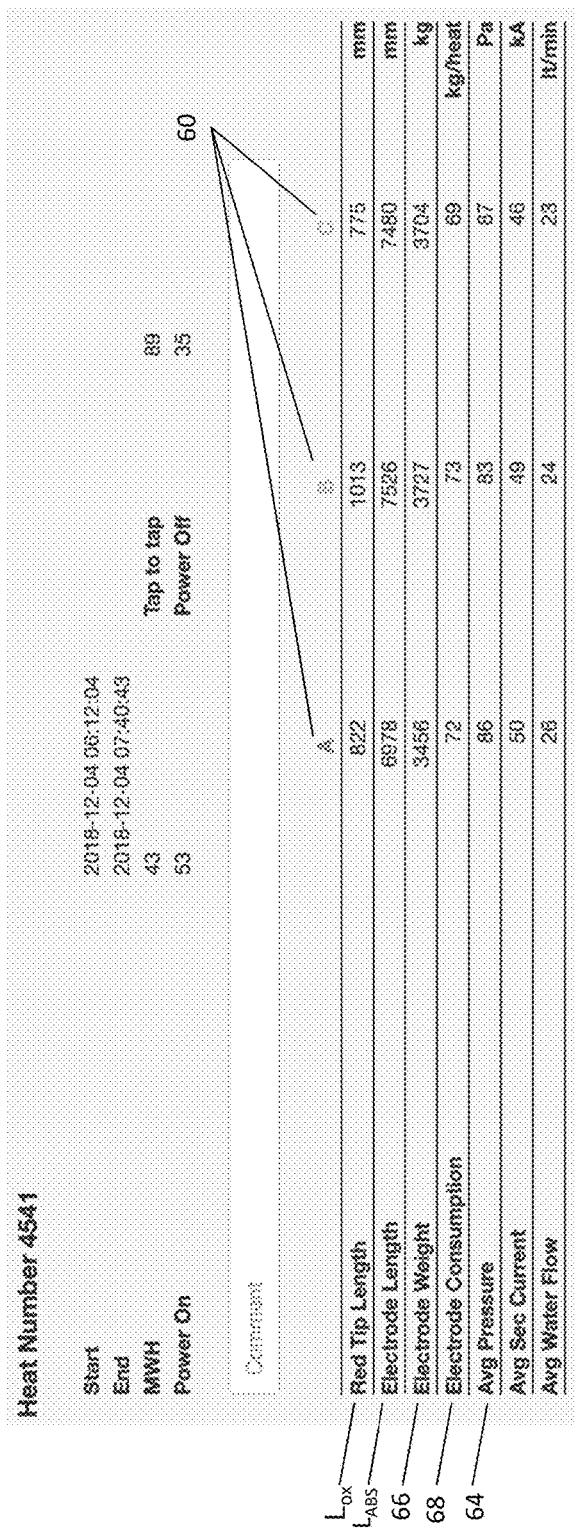
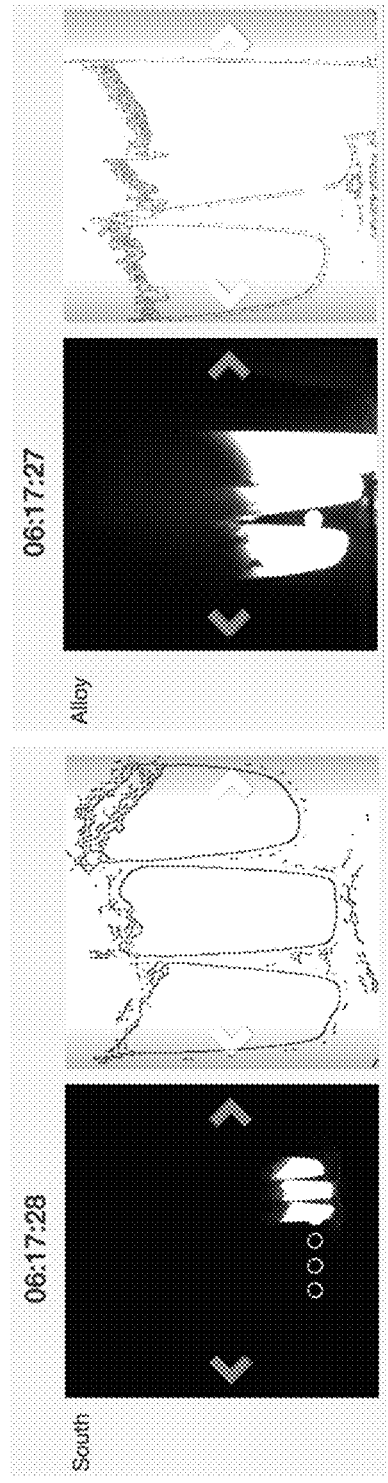
Fig. 3

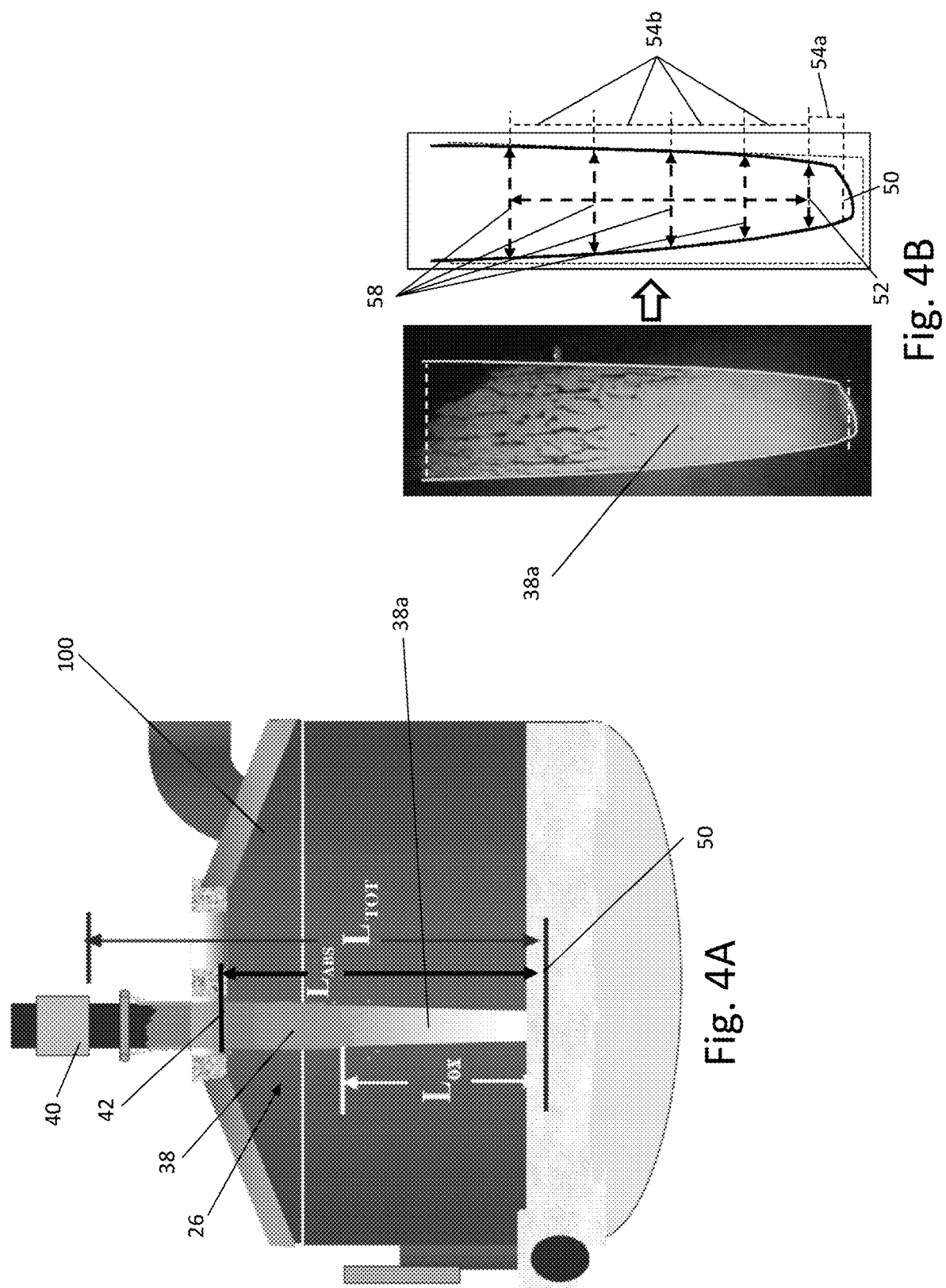

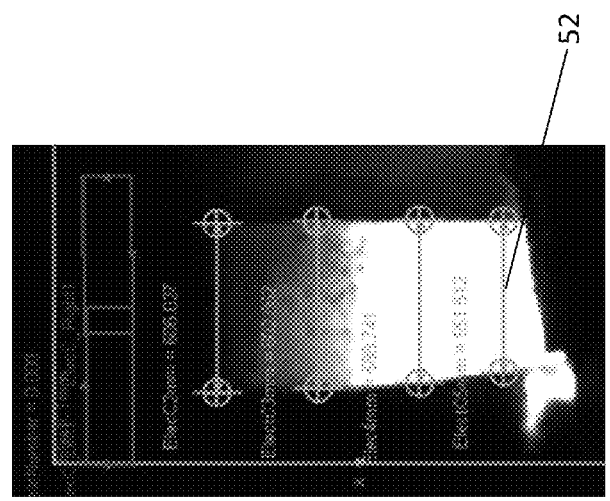
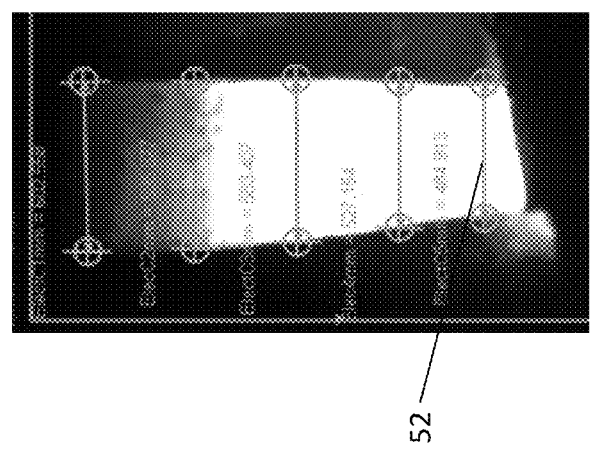
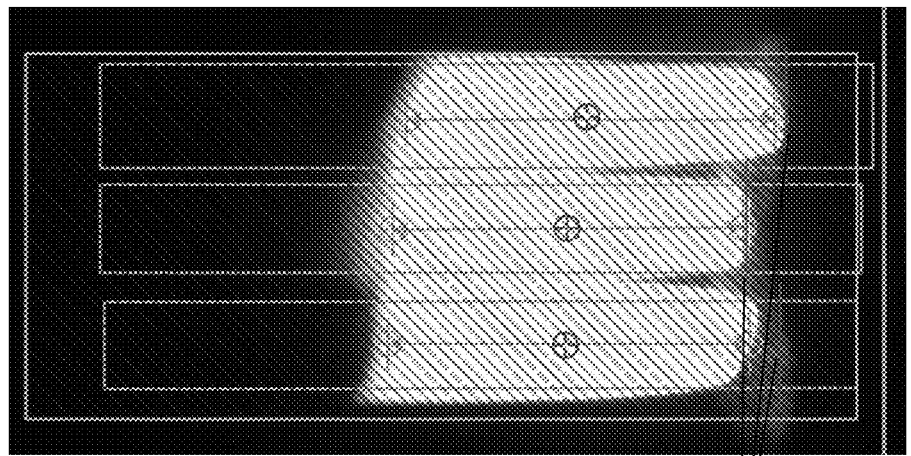
Fig. 5B
Fig. 5A

METHOD FOR DETERMINING ELECTRODE CONSUMPTION WITH MACHINE VISION

CROSS-REFERENCE TO RELATED APPLICATIONS

This application claims priority from U.S. Provisional Patent Application No. 62/813,205 filed on Mar. 4, 2019 which is herein incorporated by reference in its entirety.

STATEMENT REGARDING FEDERALLY SPONSORED RESEARCH

Not Applicable.

APPENDIX

Not Applicable.

BACKGROUND OF THE INVENTION

Field of the Invention

The present invention relates to electrodes, and more particularly to monitoring electrode consumption in an Electric Arc Furnace (EAF) melt shop.

Related Art

Electric Arc Furnaces (EAF) have long been used to convert scrap metal into molten steel. Generally, scrap material is heated within the furnace by means of an electric arc that is either generated between a cathode and graphite electrode in a DC furnace or between three graphite electrodes in an AC furnace. In either case, the graphite electrodes are continuously consumed during the heating process as electric power is delivered through the electrodes and into the furnace. Accordingly, it is a desire to those in the EAF industry to provide EAF monitoring and management systems that optimize efficiency through the evaluation and control of the electrode consumption.

In operation, an EAF operates as a batch melting process producing batches of steel known as "heats." The EAF operating cycle is called the tap-to-tap cycle and is made up a series of operations including furnace charging, melting, refining, de-slagging, tapping and furnace turn around. Modern systems target a tap-to-tap cycle time of less than sixty (60) minutes but some are capable of faster tap-to-tap times, such as thirty-five to forty (35-40) minutes. Electrodes used during the EAF operations are consumed during each cycle through oxidation and tip sublimation with small pieces being lost around the connecting joint. Other discontinuous electrode portions may be lost from mechanisms such as mechanical breakage during furnace operations and/or butt loss and collar loss from the bottom piece of the electrode. Various systems attempt to optimize electrode consumption by measuring electrode performance as new electrodes are added. It would be beneficial to quantify the consumption of electrodes in real time from heat to heat and determine the extent to which the consumption is at the sides and is at the tip and whether any of the consumption is due to butt loss.

Determining electrode oxidation is desired by those in the EAF industry where butt losses and high electrode consumption can be caused by severe oxidation. In particular, a higher current density in a severely oxidized portion of the electrodes increases the likelihood of splitting, in addition to thin socket wall cracks which cause end losses and high consumption. However, high oxidation can also be caused by low consumption or during extended runs with lower current. Electrodes that last longer are exposed to oxidizing conditions longer and will oxidize more and appear more "penciled" than those that do not last as long. Carbon will oxidize when exposed to high temperatures and oxygen. Generally, graphite will oxidize when it becomes visibly red in color and this takes place generally above one thousand degrees Fahrenheit (1,000° F.). It is almost impossible to see and quantify this oxidation within the extreme environment within an EAF. However, it can be observed and visually reflected in the tapering of the electrodes. Accordingly, there is a desire for a system which monitors the length and diameter of the electrodes so that the measurements of one or both of these variables can be used in determining the oxidation level.

Most EAF monitoring and management systems in the prior art measure electrode consumption when new electrodes are added, and other systems use consumption models to predict graphite consumption. In both instances, these systems fail to track electrode consumption in real time by monitoring electrode length and diameter between heats. For example, the accepted Bowman Model may be used for predicting electrode consumption without including breakage. The equations and variables for the Bowman Model are as follows:

$$E_{Tip} = N_E \times I_E^2 \times F_T \times \frac{T_S}{G_A}$$

$$E_{side} = N_E \times L_S \times \pi \times \left(\frac{D_E + D_T}{2}\right) \times F_S \times \left(\frac{T_S + T_N}{G_A}\right)$$

$$E_{total} = E_{tip} + E_{Side}$$

$N_E$ = Number of electrodes (1 for DC, 3 for AC)
$I_E$ = Electrode Current in KA—measured variable
$F_T$ = Tip consumption factor (0.0287 lbs/h/KA)
$T_S$ = Power on Time—measured variable
$T_N$ = Power off Time—measured variable
$G_A$ = Furnace Tap Weight—estimated or measured variable
$L_S$ = oxidizing electrode length—assumed
$D_E$ = Electrode nominal diameter—known or measured variable
$D_T$ = Electrode Tip Diameter—assumed
$D_T/D_E$ = 0.68 for AC; 0.82 for DC
$F_S$ = Side oxidation factor (0.008534 lbs/h/in$^2$, i.e, 6 KG/M$^2$ H)

Notably, tip diameter and oxidizing of the electrode are assumed in the Bowman Model above. These figures can be measured offline on cold electrodes, but the heat and severe environment has so far prohibited these figures from being actively and accurately measured while the electrode is in use on the EAF. Accordingly, there is a desire in the EAF industry to provide a system that measures these consumption parameters for use in consumption forecasting models.

Another known system uses machine vision in connection with electrode monitoring as described in an article by Asier Vicente and co-authors (Gutierrez, J. A., Arteche, Jose Antonio, Macaya, I.) entitled *Liquid Steel Level Measurement at Electric Arc Furnaces without Increasing the Power Off Time* (presented at the European Steelmaking Conference and Expo on May 11, 2016). As explained in the Vicente article, images captured using machine vision are processed and analyzed to determine electrode positioning at certain moments during a heat. Consequently, as liquid level information is available, system integration allows for the creation of new process management tools for EAF optimization based on electrode positioning. However, this system uses imaging for electrode length calculation to determine the liquid surface level and does not include edge detection for monitoring electrode diameter during each heat. Accordingly, even with the advanced suggested by the Vicente article, there continues to be a desire in the EAF industry to calculate electrode oxidation.

Other electrode consumption systems measure direct reduced iron (DRI) and/or hot briquetted iron (HBI) per melt ton. Higher electrode consumption is expected when DRI and HBI are in the charge mix and the practice calls for decarburizing to lower carbons ($C_{max}$ of 0.05%). In operation, the decarburization to lower carbons tends to increase electrode consumption because of longer refining times and increased oxidation in the bath/slag. In addition, higher quality demands may result in lower yields. Thus, if electrode consumption is based on tons shipped rather than tons melted, the resulting higher revert rate from the tightened quality demands results in higher calculated electrode consumption.

Another system in the prior art, described in U.S. Pat. No. 9,439,247 uses an electrode positioning system relative to hydraulic pressure to determine when an electrode has been added to the EAF. The actuating force that moves the electrode columns is provided by a hydraulic actuator system in which hydraulic pressures move each of the corresponding electrode columns upward and downward, and the actuating pressure at each electrode column is measured. The system described in the '247 patent measures the harmonics within the electric arc and takes a hydraulic pressure reading when the harmonics are below 10%. In operation, the harmonics are below 10% in the phase when all of the steel is fully melted in the furnace and the arc is steady. Since the hydraulic pressure correlates to the weight of the electrodes, a snapshot of the hydraulic pressure allows the system to determine if a new electrode portion was added because such an addition results in a spike in the pressure value. This patented system is a modification of a previously known methodology in which the average hydraulic pressure is determined for an entire heat. The measurement taken in the '247 Patent is predicated on a drop in harmonics rather than using the average pressure during the entire heat.

Other known consumption calculations can be very accurate but can also be extremely inefficient. For example, directly weighing the electrode columns at the start and the end of an established time period that encompasses multiple heats would provide accurate results for the overall consumption during the heats but has inherent drawbacks, such as downtime and the cost of weighing equipment. Another common consumption calculation method is to take the average number of heats between each electrode addition to calculate consumption. Conversely and perhaps most common, many steel producers count the number of additions and heats over a period of time to measure consumption. In practice, if the time period is long enough to include many additions, the resulting calculation may be reasonably accurate. However, weekly numbers can fluctuate significantly and daily numbers are not sufficient to provide accurate calculations. Many of these known methodologies rely on manual record keeping that can be in error and would result in inaccurate results, such as when an addition of an electrode section or a heat is not properly recorded. Accordingly, it is preferable for the EAF system to record real time measurements.

It is common to evaluate electrode consumption using a "heats between addition" methodology such as exemplified below.
  Phase #1: 4 pieces consumed in 40 heats
  Phase #2: 4 pieces consumed in 38 heats
  Phase #3: 3 pieces consumed in 32 heats
  Total: 11 pieces consumed in 110 heats=10.0 heats/Pc.
    Average shipment wt=3100 lbs/pc.
    Average tons/heat=220 Tons.
    Consumption rate=(3100×3)/(10×220)=4.22 lbs/ton Thus, there still remains a need in the EAF industry for an integrated EAF management system that is capable of recording real time electrode measurements as well as calculating the electrode consumption from the measurements for each heat in order to track and manage the optimal consumption of graphite electrodes during each heat, preferably in real time. The improved system would be able to improve the usage of electrodes during the operation of an EAF. In addition, there is a desire for a system utilizing a real time consumption model that can calculate and determine the graphite electrode consumption for every heat. The data analysis will provide insights currently not available to furnace operators, such as comparing consumption rates between different suppliers. Further, there remains a need in the EAF industry for a monitoring and control system which simultaneously and in real time collects data on all four primary criteria for graphite electrode consumption, namely, red tip length corresponding to the oxidation area, electrode diameter, total electrode length, and tip shape. For some determinations, the system may also analyze the data in real time.

Examples of known EAF monitoring systems are described in the following prior art references which are hereby incorporated by reference: U.S. Pat. Nos. 4,852,120, 5,099,438, 5,204,872, 5,539,768, 6,804,582, 6,934,039, 7,991,039, 9,439,247, and 9,784,500.

SUMMARY OF THE INVENTION

The present invention relates to a monitoring system for the usage of graphite electrodes during the operation of an electric arc furnace (EAF). The system and method described herein provides an integrated total management system that is capable of tracking and managing the optimal consumption of graphite electrodes in real time. In operation electrode consumption is determined for each heat of an EAF by measuring the length and tip diameter of each electrode within an EAF. In a particular aspect of the present invention, a red tip length of each electrode is determined for each heat cycle and is compared to the red tip length of the corresponding electrode for the previous heat cycle to evaluate a potential for a butt loss situation. Subsequently, the length and tip diameter are used to determine the electrode consumption amount in a consumption model.

Another feature of the consumption determination system may also include correlating a known hydraulic pressure in a hydraulic actuator system within the EAF to a known electrode weight. The pressure and the calculated electrode consumption amount are subsequently stored in a database and correlated to measured EAF parameters.

Generally, the system combines four primary components, namely (1) the utilization of advanced camera technology to capture images of each electrode column during every heat, (2) processing the captured data with artificial intelligence to analyze tip consumption, oxidation loss, and collar and butt loss wherein the data may also be sent and stored in a cloud server, (3) determination of actual electrode consumption and usage with real time data being compared to and integrated with modeled data, and (4) providing improved consumption models based on real time data with the application of machine learning technology. In this way, electrode consumption in each heat is tracked and recorded in detail and can be compared or integrated with EAF parameters that influence consumption in real time using actual data from the EAF.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

FIG. 3 is an exemplary dashboard depicting electrode data recorded according to the present invention.

FIG. 4A illustrates electrode length measurements gathered according to the present invention.

FIG. 4B is a detail view illustrating edge detection and the corresponding length and width measurements gathered according to the present invention.

FIG. 5A is a detail view of red-tip end detection and length measurement according to the present invention FIG. 5B is a detail view of red-tip diameter detection and diameter measurement according to the present invention

DETAILED DESCRIPTION OF THE PREFERRED EMBODIMENTS

The following description of the preferred embodiment(s) is merely exemplary in nature and is in no way intended to limit the invention, its application, or uses.

Figure 1:
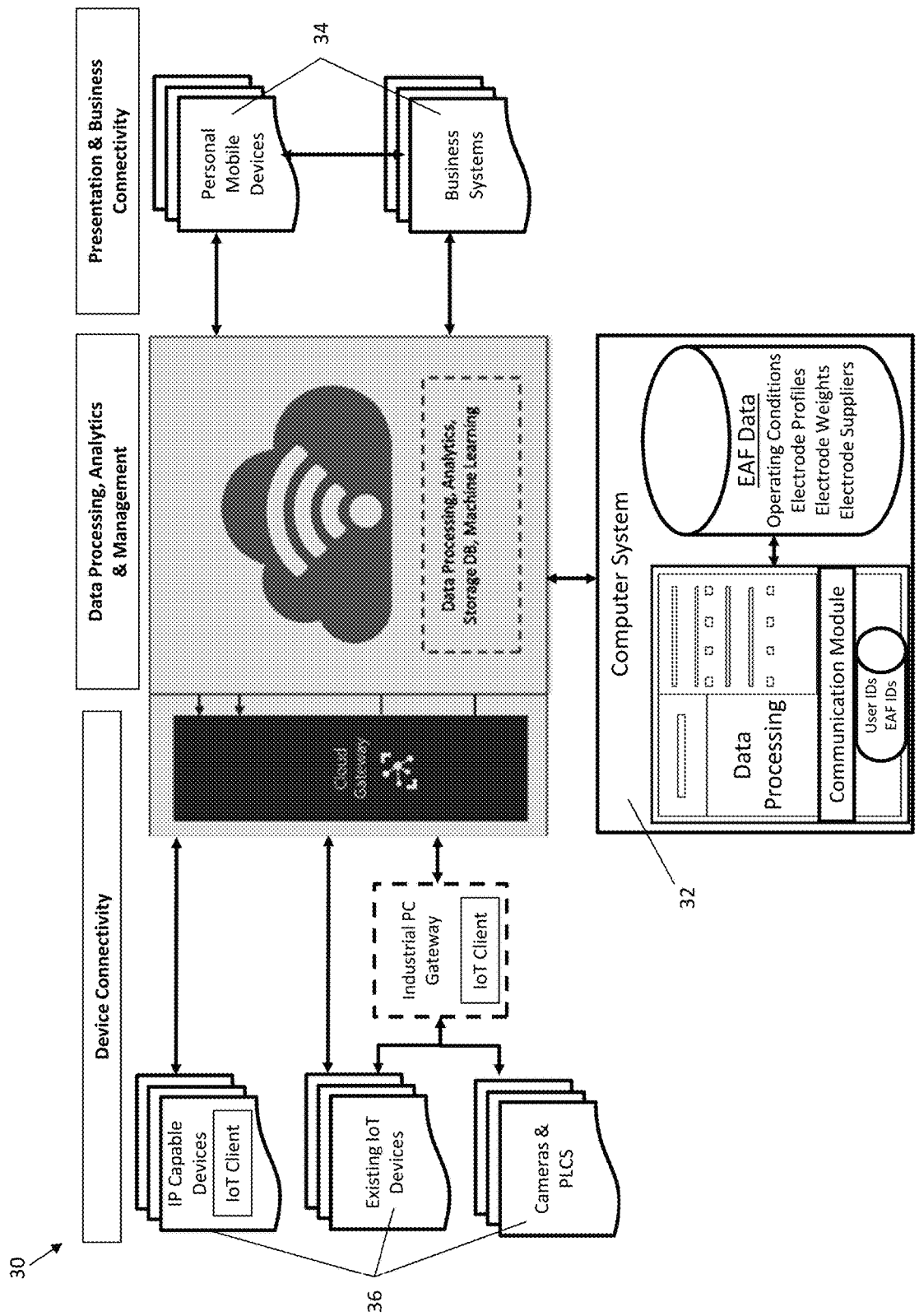
FIG. 1 is a schematic diagram of the EAF monitoring and tracking system according to the present invention.
Figure 2:
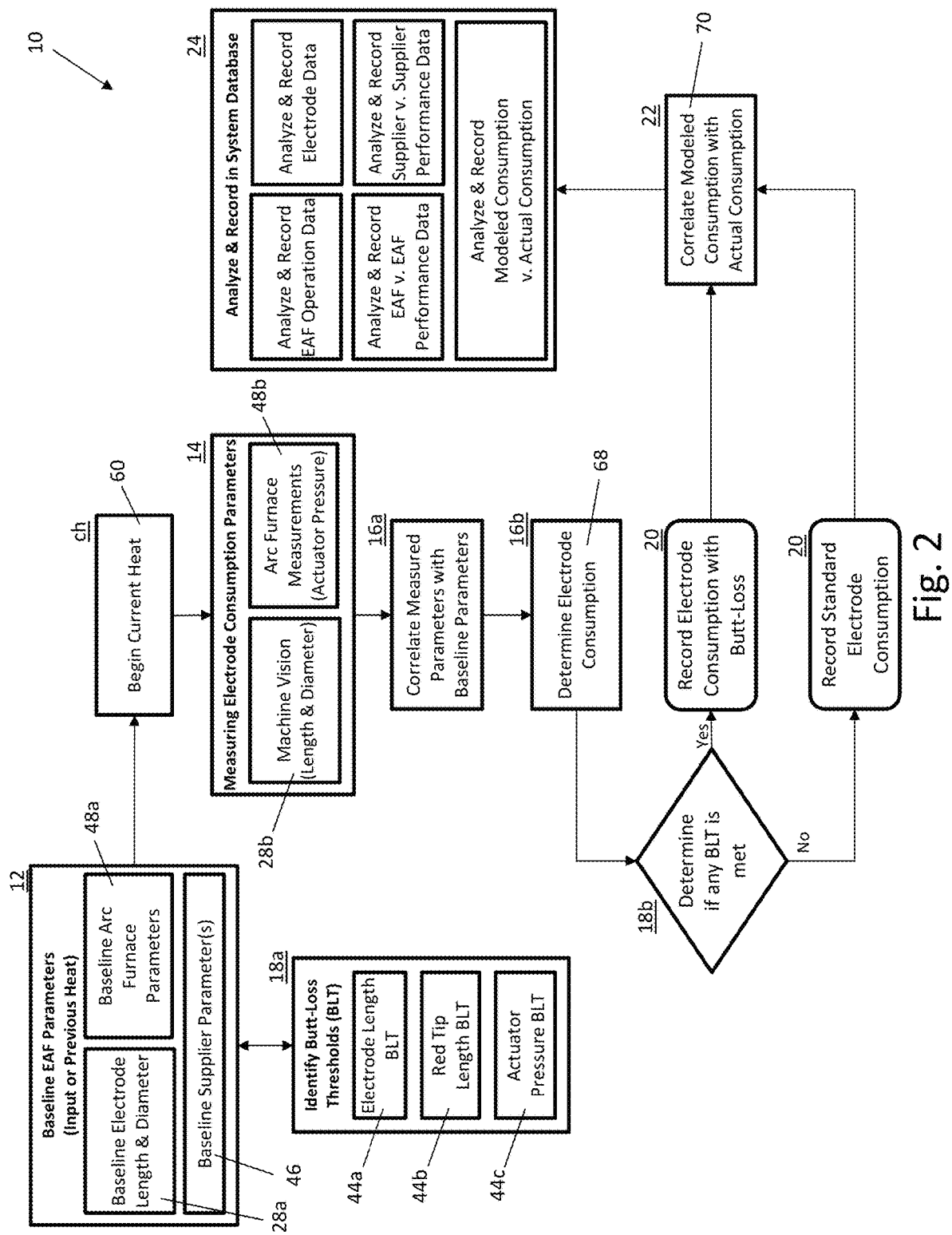
FIG. 2 is a flow chart of the process according to the present invention.

The IoTrode electric arc furnace (EAF) electrode monitoring and consumption evaluation system 10 described herein is schematically shown in FIG. 1 and provides the basis for a number of improvements in computerized EAF monitoring and controls and may be used in connection with various EAF improvement measures. At their base, these various EAF improvement measures include the methodology for the electrode monitoring system as generally shown in the flow chart of FIG. 2 and described in detail below which utilizes a real time consumption model running in a computer processor and using measurements from machine vision to calculate and determine the graphite electrode consumption on a heat to heat basis. The results of the processing are preferably displayed on dashboard displays 60, such as the dashboards shown in FIGS. 3, 6 and 7 and can be correlated with a modeled consumption 22 based on baseline parameters.

The system uses an innovative method for determining electrode consumption for each heat in an EAF 100 using machine vision to measure electrode consumption parameters 14 and correlate them 16a with a set of baseline parameters 12. Measured electrode parameters 28b include red tip length ($L_{ox}$) and tip diameter ($D_T$) through edge detection as respectively illustrated in FIGS. 5A and 5B. It will be appreciated that the machine vision system 30 can either use a smart camera with an integrated imaging processor or a digital camera in operative communication with the computer processor 32. Accordingly, the first step in determining electrode consumption 68 uses the machine vision system to measure the length ($L_{TOT}$) and tip diameter of the electrode column(s) 38 within the EAF. The machine vision system may include one or several cameras to properly capture images of all electrodes. In operation, the machine vision system detects the bottom edge 50 of each electrode all the way to the EAF roof 42 so that the distance from the electrode's bottom edge to the EAF roof ($L_{ABS}$) can be measured and recorded as illustrated in FIG. 4A. Similarly, machine vision is used to measure the bottom tip diameter 52 of the electrode at a set location that is located at a fixed distance 54a away from the electrode's bottom edge. The location is within the oxidizing section of the electrode, i.e., within the red tip section 38a. In the particular embodiment of the system described herein, the spacing measurement of the bottom tip diameter is taken at 250 mm from the bottom edge as shown in FIG. 4B.

In addition, a camera with a telephoto lens 56 is preferably included in the machine vision application which assists in detecting the bottom edge of the electrode as shown in FIG. 5A. This camera system configuration measures the electrode diameter at five (5) fixed locations 58, including the bottom tip diameter as shown in FIGS. 4B and 5B. The four (4) additional diameters of the electrode tip are preferably spaced at equal intervals 54b from the set location used for the bottom tip diameter. In the particular embodiment of the system described herein, the spacing between each of the locations is set at 450 mm. Accordingly, an electrode diameter profile 28a is created from the multiple measurements which are subsequently recorded 20 long with the bottom tip diameter and the electrode length that are used in determining electrode consumption. The diameter profile and length information for electrodes can be compared to each other using the system's computer processor, and the effects of various control measures that are implemented for the specific assemblies can be quantified according to their impact on the oxidation of the electrodes and the corresponding consumption rates of the electrodes 24.

After the length and tip diameter are measured through machine vision, a first consumption amount of the measured electrode is determined 16b. Although other systems have attempted to accurately determine electrode consumption, the method described herein particularly bases consumption determinations on the measured length and measured diameter. For example, the system's computer processor determines electrode loss due to oxidation with algorithms, such as comparing tip diameter to the original electrode diameter using the equation below.

$$V = \frac{\pi(R^2 + rR + r^2)h}{3}$$

V=Volume of truncated cone
R=Electrode body radius ($D_E/2$)
r=Electrode tip radius ($D_T/2$)
h=height of hot electrode column (i.e., red tip length, h=$L_{OX}$)

Machine vision measurements as described herein can also be evaluated in the computer processor to quantify butt loss from heat to heat just as the system quantifies expected sublimation from heat to heat. In one methodology, the system uses image capture and determines that butt loss occurs by measuring the variance between the overall electrode length as compared to the measured oxidation level 44a. Accordingly, a butt loss threshold 18a is set and the length is compared to the threshold to determine if a butt loss has occurred 18b. For example, if measured oxidation loss suggests that the post heat electrode length should equal 98% of the original length but the measured length equates to 95% of the original length, it can be understood that 3% of the consumption level is attributed to butt loss whereas the estimated 2% is expected consumption. In this case, the measured oxidation indicates that there should only be a 2% decrease in the electrode length due to consumption based on oxidation loss only with no butt loss (i.e., $\Delta L \%_{est}$=2%). However, the measured length between consecutive heats 62, i.e., a current heat (ch) and a previous heat (ph), indicates that there has been a 5% decrease in the electrode length (i.e., $\Delta L \%_{ch, ph}$=5%). In this example case, if the butt loss threshold (BLT) has been set at twice the estimated decrease in length (i.e., BLT=2*$\Delta L$ % est), the BLT would be 4%, and the system would determine that there has likely been a butt loss because 5% is greater than 4% ($\Delta L \%_{ch, ph} \geq$ BLT). It will be appreciated that the decrease in the electrode length due to consumption for a heat can be based on one or more calculations using measured data from the heat and/or based on historical data models 70, such as shown in FIG. 6B. Additionally, it will also be appreciated that different butt loss thresholds may be established from system to system (i.e., BLT=X*$\Delta L$ % est), and the example above is intended to be illustrative of one methodology. In another methodology, rather than using a nondimensional percentage decrease in length in the butt loss evaluation, the system could use the decrease in length in units of measure in the butt loss evaluation.

Figure 6A:
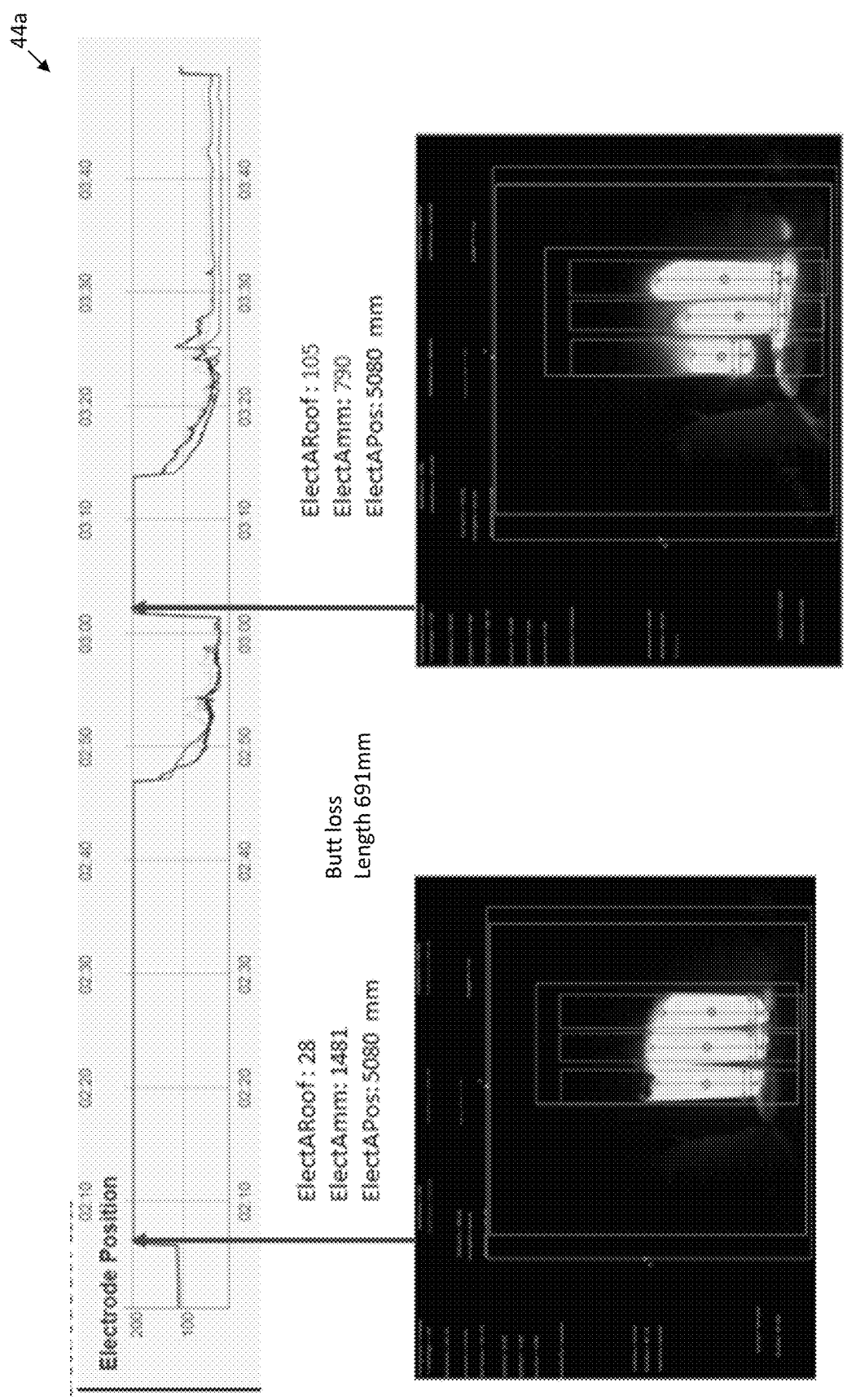
FIGS. 6A-6C illustrate butt-loss thresholds respectively corresponding to red tip length, electrode length, and electrode weight according to the present invention.
Figure 6B:
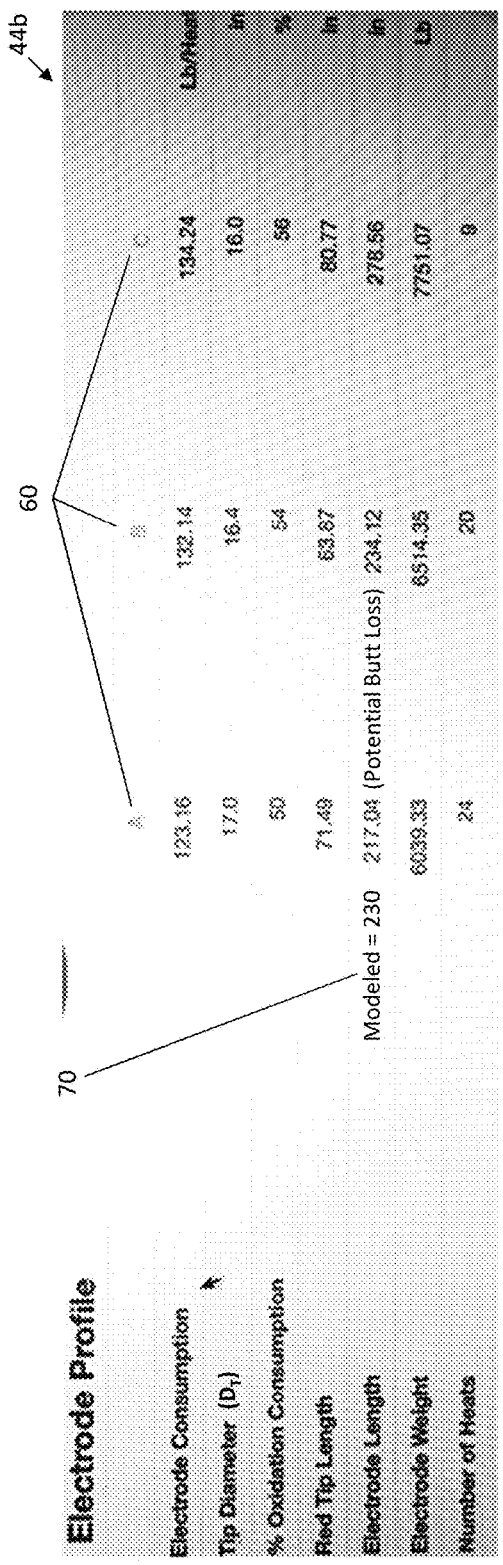
Figure 7A:
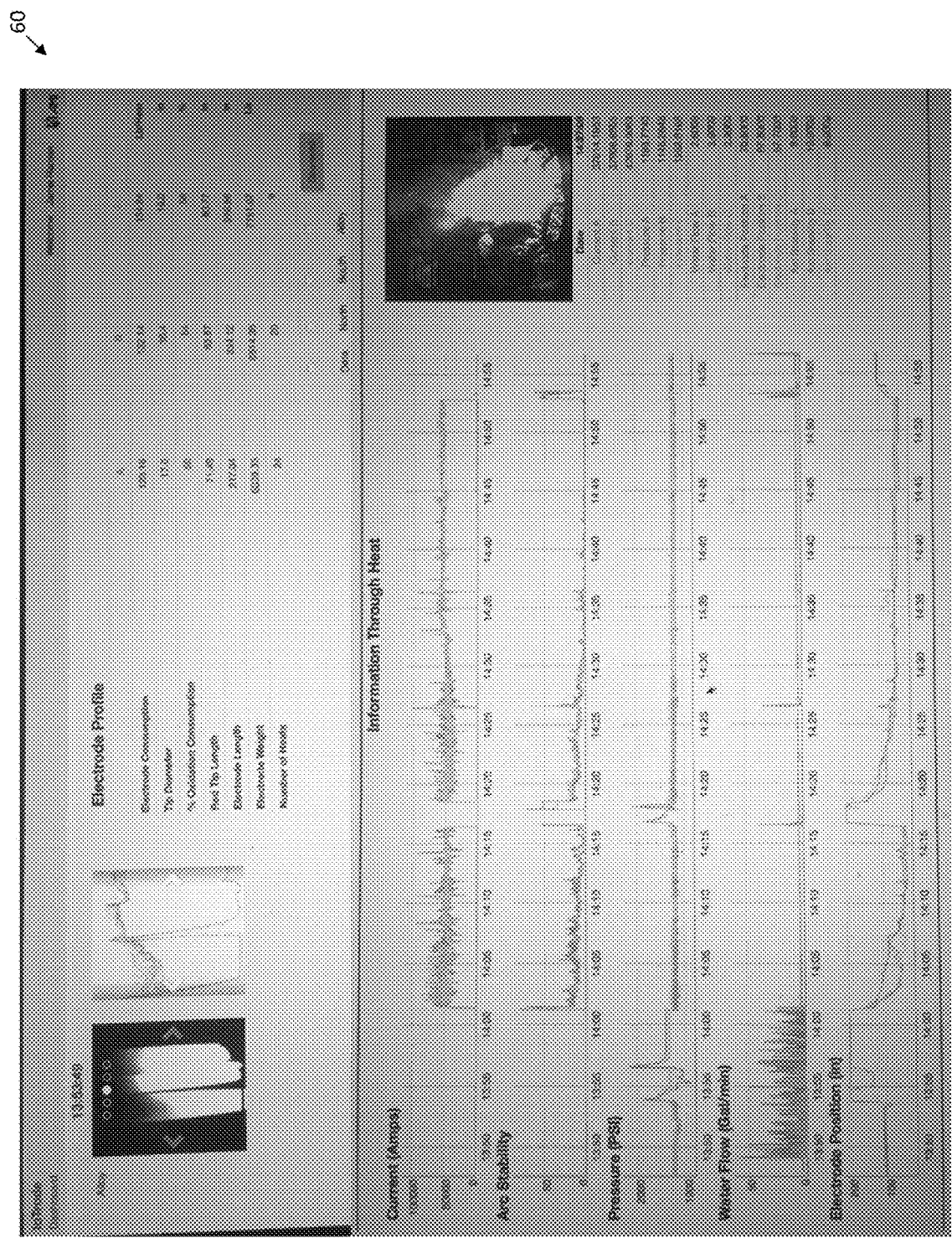
FIGS. 7A and 7B illustrate an exemplary dashboard depicting furnace and electrode data recorded according to the present invention.
Figure 7B:
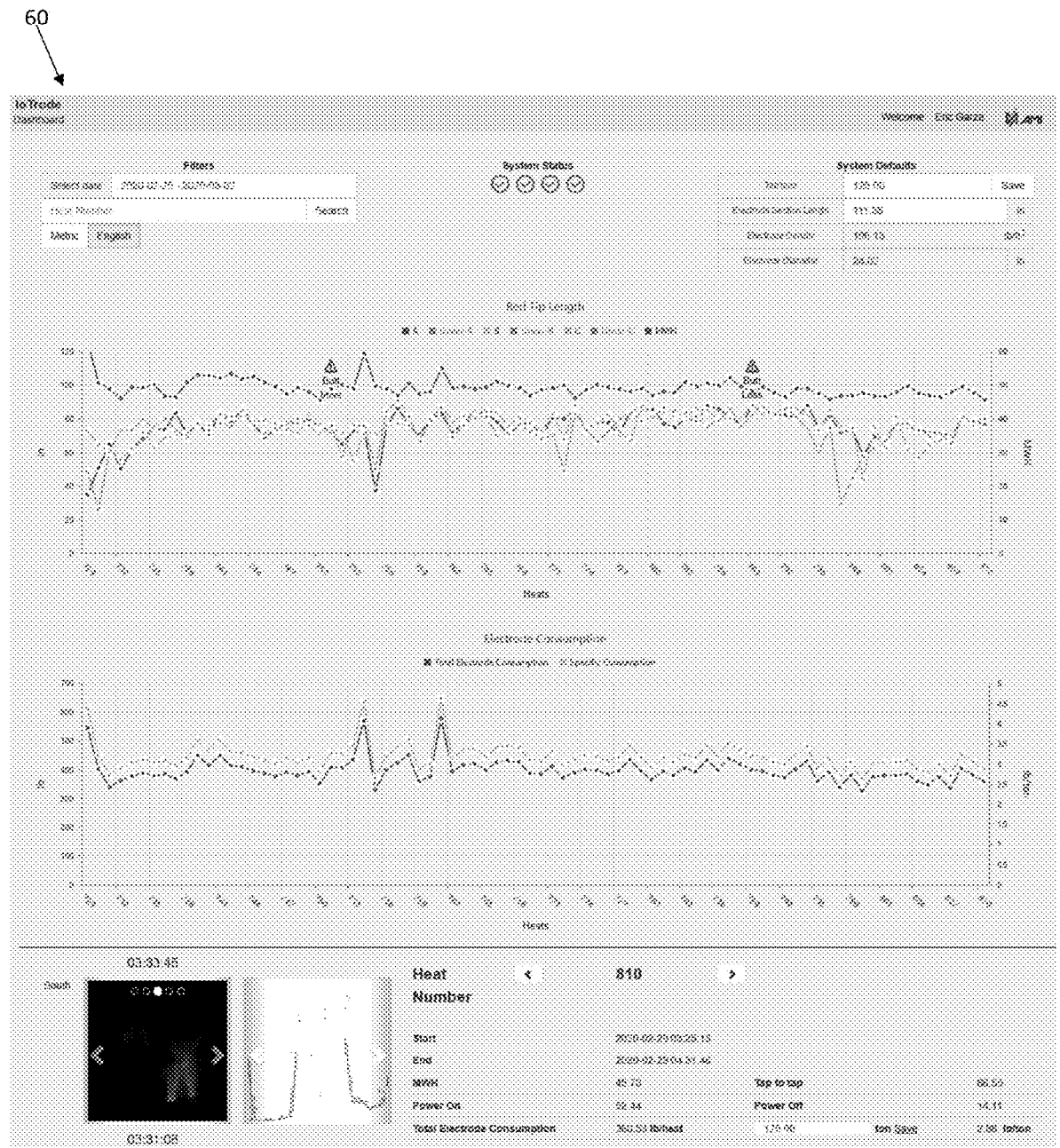

The percentage of oxidation loss can be estimated as a ratio of the mean square between the original diameter of the full electrode and the measured tip diameter, such as shown in FIG. 6A. Generally, it is typical for a 600 mm electrode tip diameter to reduce by consumption down to 320 mm on the low end and to 480 mm on the high end when the electrode portion has reached its end of service life. The tip diameter measurement is important to calculate the actual current density in the tip, ampere per centimeter square ($A/cm^2$), on each phase when calculating real time performance. In operation, if the current density at the tip is high, a higher quality graphite may be needed to support higher stresses on the tip. Some consumption models also predict that sublimation at the tip increases exponentially with current density. Accordingly, there is a relationship between EAF performance, oxidation and electrode performance wherein larger tips generally result in better consumption on the EAF and an easier job for the graphite. Thus, tip diameter measurement and analysis allows for an improved model that quantifies the aforementioned relationship for use in implementing EAF optimization measures.

Figure 6C:
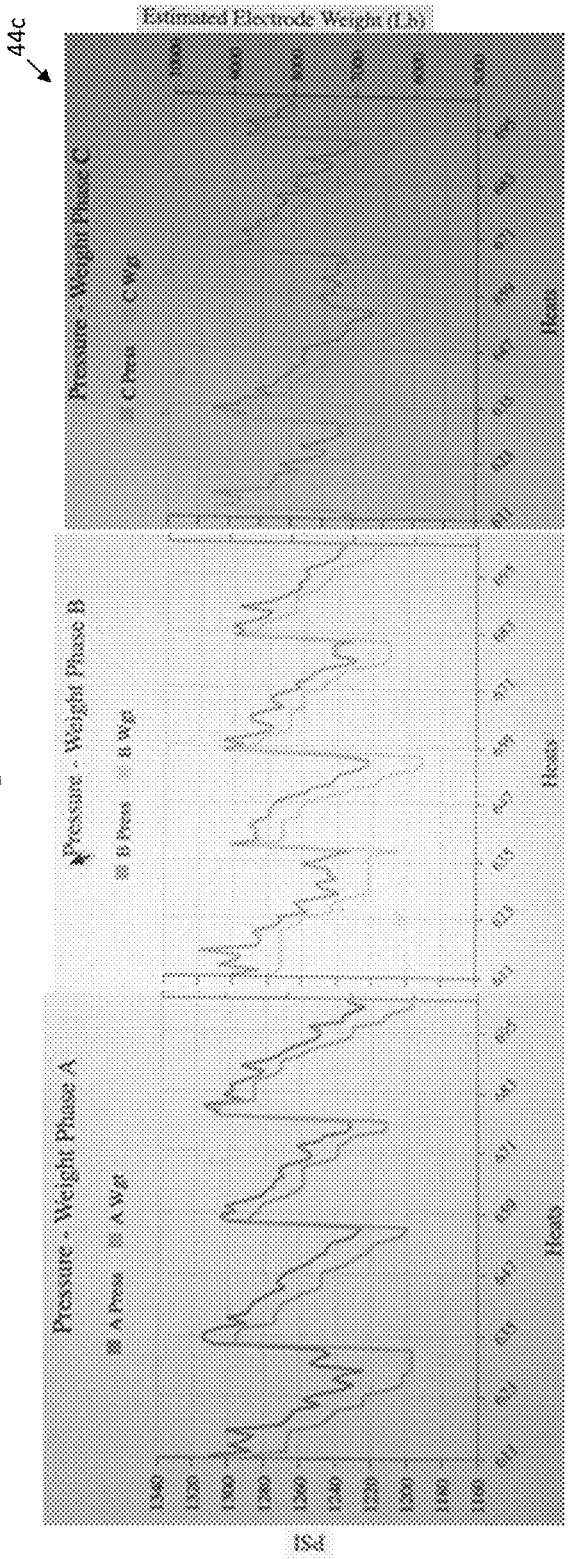

In addition to determining consumption amounts for each electrode, the method may also include the step of correlating a set of measured pressures 64 with a set of weights 66 for the electrode columns in an electrode assembly over several heats as shown in FIG. 6C. Thus, the hydraulic pressure in a hydraulic actuator system 40 can be correlated to graphite loss so that pressure variations can be used to calculate consumption in place of or in addition to the loss measured using the machine vision data. The use of different measurements, such as the pressure and machine vision, can be used to independently calculate the consumption amounts from heat to heat, and the results from these different methods of determining the consumption can be compared to one another for validation purposes.

In addition to the correlation between oxidation loss and tip diameter, an improved model may also correlate hydraulic pressure with electrode length lost when determining electrode consumption as referenced above. For example, an electrode having a 24" diameter (610 mm) and 110" length (2794 mm) weighs roughly 3200 lbs. (1450 kg) and each inch of electrode that is lost equates to 29 lbs. (13 kg) of graphite. When the lost length determined using machine vision according to the present invention is subsequently evaluated in relation to average hydraulic pressure during the phase of the heat, a 98% correlation has been found. With this high correlation factor between the machine vision and hydraulic pressure, it will be appreciated that the hydraulic pressure can still be used to determine the consumption for each heat even when the machine vision data may not be available, such as when the machine vision system is inoperable or for some EAF facilities that do not have machine vision. Further still, hydraulic pressure measurement may be more reliable at times to determine the consumption because it is not limited by camera alignment and is a standard EAF parameter that can be measured with sensors used in standard EAFs. Accordingly, the improved model may also include the average hydraulic pressure knowing that the consumption of the electrode decreases its weight and results in a proportional drop in the average hydraulic pressure.

With the machine vision data being evaluated on a per heat basis and with the correlation of the hydraulic pressure measurements, there are multiple ways to determine possible butt loss per phase after each heat is ended 44c. As indicated above, the change in length of the electrode can be used to determine the possibility of butt loss. Additionally, the average hydraulic pressure (P) and/or the red tip length ($L_{ox}$) for consecutive heats can be evaluated to determine if there has been a butt loss. As with the estimated length determination, the estimated pressure change between heats due to normal electrode oxidation loss can be either calculated or determined from historical data ($\Delta P_{est}$), and a butt loss threshold based on pressure measurements can be set. For example, the butt loss threshold (BLT) can be set at quadruple the estimated decrease in pressure (i.e., BLT=4*$\Delta P_{est}$), and when the measured pressure change between the current heat and the previous heat ($\Delta P_{ch,ph}$= $P_{ch}-P_{ph}$) exceeds the expected pressure change, the system indicates that there has likely been a butt loss (Butt Loss Likely: $\Delta P_{ch,ph} \geq$ BLT, set at 4*$\Delta P_{est}$ in the example).

It will also be appreciated that the system can compare the estimated red tip length ($L_{OXest}$) with a measured red tip length ($L_{OX}$) to determine the likelihood of a butt loss 44b. In this methodology, the system may use the measured red tip length from each previous heat ($L_{OXph}$) or an average red tip length from multiple prior heats as the estimated red tip length for a direct comparison to the red tip length in the current heat ($L_{OXch}$) because the red tip length should be approximately similar from heat to heat. Again, as with the methods described above, a corresponding butt loss threshold for a difference in red tip lengths would be set based on either nondimensional value or an absolute value. When the system indicates that there has likely been a butt loss for one or more of the electrodes from a previous heat cycle to a current heat cycle, either by hydraulic measurements or machine vision measurements, the amount of graphite lost is calculated for the corresponding heat cycles. When using the hydraulic pressure, there can be a correlation between the pressure and the weight of the electrode that allows for an estimate of the graphite lost due to a butt loss. However, it will be appreciated that the machine vision will likely provide a more accurate number than the pressure. When using an analysis of the machine vision data, the average diameter and the difference between the previous heat red tip length and the actual heat red tip length are used for the calculation to determine the electrode graphite loss in kilograms due to butt loss according to the equation below.

$$\pi * \text{average}(D_{ph}, D_{ch})^2 * (L_{ph} - L_{ch}) * \rho / 4$$

$D_{ph}$=Electrode tip diameter of the previous heat
$D_{ch}$=Electrode tip diameter of the current heat
$L_{ph}$=Electrode red tip length of previous heat
$L_{ch}$=Electrode red tip length of current heat
$\rho$=Electrode average density In operation, the monitoring system described herein determines a set of consumption amounts for a corresponding electrode from heat to heat. These consumption amounts and EAF operating parameters are subsequently stored in the database for analysis. Where one of the operating parameters may be the hydraulic pressure operating on the electrode, hydraulic pressure can be used in the update model instead the actual lost graphite measurement. As explained above, the measured pressures correlate to consumption amounts which can subsequently be compared to other consumption amounts that are stored in the database for other electrodes that come from different suppliers and are used in the same EAF or that are from the same supplier and are used in different EAFs.

As explained in the background section above, it is generally known to use various models to predict electrode consumption in an EAF. For example, the Bowman Model particularly teaches a consumption model for determining electrode consumption. However, this model is limited because the tip diameter and the oxidation area's red tip length are assumed. Accordingly, the measured tip diameter and red tip length can now be integrated with previous models, such as the Bowman Model referenced below, or be used in an updated and more accurate models where tip and side consumption are calculated as shown in the Figures rather than assumed.

$$E_{Tip} = N_E \times I_E^2 \times F_T \times \frac{T_S}{G_A}$$

$$E_{side} = N_E \times L_S \times \pi \times \left(\frac{D_E + D_T}{2}\right) \times F_S \times \left(\frac{T_S + T_N}{G_A}\right)$$

$$E_{total} = E_{tip} + E_{Side}$$

$N_E$=Number of electrodes (1 for DC, 3 for AC)
$I_E$=Electrode Current in KA—measured variable
$F_T$=Tip consumption factor (0.0287 lbs/h/KA)
$T_S$=Power on Time—measured variable
$T_N$=Power off Time—measured variable
$G_A$=Furnace Tap Weight—estimated or measured variable
$L_S$=oxidizing electrode length—measured with machine vision
$D_E$=Electrode nominal diameter—known or measured variable
$D_T$=Electrode Tip Diameter—measured with machine vision
$D_T/D_E$=0.68 for AC; 0.82 for DC
$F_S$=Side oxidation factor (0.008534 lbs/h/in$^2$, i.e. 6 KG/M$^2$ H)

The model takes advantage of advanced artificial vision technology which is implemented into a robust measurement system suitable for a steel shop environment. Preferably, the machine vision described above includes a megapixel, extended dynamic range smart camera with an infrared filter. Since the sensor does not require physical contact with the object being measured, it can be placed far from the incandescent electrodes. To accurately measure the red tip length in the oxidation area within a preferred tolerance, such as +/−10 mm, a self-calibrating algorithm automatically detects the electrode edge and correlates pixel dimensions in the image to physical dimensions of the objects in the image. In operation, this measurement occurs every time the electrodes rise before tapping. In addition, the electrode edge distance to the furnace roof is measured to determine if part of the electrode is partially occluded by the furnace roof.

After the red tip length, electrode diameter, electrode length, and tip shape are measured with machine vision and recorded, EAF data can be gathered from the programmable logic controllers (PLC), information systems, cameras and EAF sensors 36 and collectively sent via an encrypted platform to a cloud-based collective database or may be stored in a local database 32. In addition, gathered EAF data may also be accessed at a local dashboard which may include but is not limited to the exemplary dashboards shown in FIGS. 7A and 7B. Thus, measured data can be viewed and analyzed in real time with computer processors that are remote from EAF facilities or that are local to a particular EAF 34. It will be appreciated that cloud-computing allows the remote computers to evaluate the information stored in the collective database, including comparisons on the electrodes and other operating conditions from multiple EAFs, which allows for identifying patterns between the EAFs operating conditions and the consumption of the electrodes and quantifying the differences in the service life of electrodes from various suppliers.

The collective database can be used as baseline information for the creation and implementation of various EAF optimization measures which can be tailored to heats for particular electrode suppliers and furnaces. For example, the particular suppliers of electrodes used in each of the EAFs that are being tracked can be stored in the database along with the corresponding data and consumption calculations 46. With the data and calculations, the consumption rates of electrodes can be compared for different suppliers. It will be appreciated that different operating conditions at different EAFs will result in different consumption rates so it would be beneficial to build a repository of data that can help normalize some of the variations in the operating conditions and which are anticipated 48a prior to a heat and which can be measured 48b during a heat. For example, repeating multiple heats at the same operating conditions in the same EAF with electrodes from a set of suppliers could be compared to each other and could also be compared to repeated heats at different operating conditions at another EAF with electrodes from the same set of suppliers.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, it will be appreciated that the measurements and corresponding calculations of consumption disclosed herein can be stored in the database and summed to a total calculated consumption over many heats during which time multiple new electrode portions are added and then removed when they have reached their lifetime. These electrode portions can be weighed before they are added to the electrode column and again weighed when they are removed from the column in their consumed state at their corresponding end of service life to determine an approximate running total of consumption by weight, and the total calculated consumption over the heats can be evaluated relative to the total weighed consumption as yet another check on the calculations. Thus, the breadth and scope of the present invention should not be limited by any of the above-described exemplary embodiments, but should be defined only in accordance with the following claims appended hereto and their equivalents.

What is claimed is:

1. A method for determining electrode consumption for each heat in an electric arc furnace, comprising the steps of:
providing a baseline electrode diameter;
measuring a red tip length of an electrode column in an electrode assembly using a machine vision system;
measuring a tip diameter of the electrode column using the machine vision system; and
determining in a computer processor a modelled consumption amount of the electrode column using the measured red tip length, the measured tip diameter and the baseline electrode diameter.

2. The method of claim 1, further comprising the steps of:
storing in a database a set of weights for the electrode column associated with a set of heats;
correlating in the processor a set of measured pressures with the set of weights for the electrode column for the set of heats, wherein the measured pressures are for a hydraulic actuator operating on the electrode column; and
calculating in the computer processor a correlated consumption amount for the electrode column using a difference in the weights for a first heat and a second heat.

3. The method of claim 2, further comprising the step of comparing in the computer processor the modelled consumption amount with the correlated consumption amount, wherein the baseline electrode diameter is a nominal electrode diameter, and further comprising the step of completing the step of measuring the red tip length and the tip diameter while the hydraulic actuator is holding the electrode column.

4. The method of claim 1 further comprising the steps of:
determining in the computer processor a first set of consumption amounts for a plurality of electrode columns in a corresponding set of electrode assemblies for a plurality of heats in a plurality of electric arc furnaces;
storing in a database the set of consumption amounts and a set of electric arc furnace operating parameters for each of the heats and the corresponding electric arc furnaces; and
correlating in the processor the set of consumption amounts for the plurality of electrode columns in the corresponding set of electrode assemblies and the electric arc furnace operating parameters for the plurality of heats and the plurality of electric arc furnaces.

5. The method of claim 4, wherein the database stores operating conditions for the corresponding electric arc furnace operating parameters for the plurality of heats and the plurality of electric arc furnaces, and wherein one of the electric arc furnace operating parameters stored in the database is for a set of measured pressures for a set of hydraulic actuators operating on the corresponding electrode columns.

6. The method of claim 5, further comprising the steps of:
correlating in the processor a set of measured pressures with a set of weights for the corresponding electrode columns;
calculating in the computer processor a second set of consumption amounts for the electrode columns using differences in the weights between a set of first heats and a set of second heats for the corresponding set of electric arc furnaces; and
comparing in the computer processor the first set of consumption amounts with the second set of consumption amounts for the set of heats and the electrode columns.

7. The method of claim 1, further comprising the steps of:
setting a butt loss threshold based on a change in the measured red tip length of the electrode column; and
comparing in the computer processor the measured red tip length during a pair of consecutive heats with the butt loss threshold to determine a butt loss occurrence.

8. The method of claim 1, further comprising the steps of:
setting a butt loss threshold based on the red tip length of the electrode column;
comparing in the computer processor the measured red tip length of the electrode column with the butt loss threshold to determine whether a butt loss has occurred.

9. The method of claim 1, further comprising the steps of:
setting a butt loss threshold based on a pressure change for a hydraulic actuator operating on the electrode column;
measuring a first pressure and a second pressure of the hydraulic actuator during a pair of consecutive heats;
comparing in the computer processor the difference between the first pressure and the second pressure with the butt loss threshold to determine whether a butt loss has occurred.

10. The method of claim 8, further comprising the steps of:
determining a bottom edge of the electrode column using an edge detection algorithm in at least one of the machine vision system and the computer processor;
defining a lowermost diameter measurement location on the electrode column for the step of measuring the tip diameter, wherein the lowermost diameter measurement location is set by at least one of the machine vision system and the computer processor at a distance spaced from the bottom edge, and wherein the distance is less than a maximum diameter of the electrode column;
measuring a plurality of additional diameters of the electrode column in the red tip length using the machine vision system, wherein the measurements for the additional diameters are taken at a set of locations spaced at intervals from the lowermost diameter measurement location; and
defining a profile of the electrode column along the red tip length with the tip diameter and the additional diameters of the electrode column at the corresponding set of locations for the measurements.

11. The method of claim 1, wherein the step of measuring the tip diameter of the electrode column further comprises the steps of:
 imaging a lower section of the electrode column with a second camera to produce a second image;
 determining an edge shape around a red tip section of the electrode column in the second image using the edge detection algorithm running in the machine vision system, wherein the machine vision system is comprised of at least one of a smart camera with an integral processor as the second camera and a digital camera as the second camera in operative communication with the computer processor;
 determining a first bottom edge of the electrode column in the edge shape using at least one of the smart camera and the computer processor;
 defining a lowermost diameter measurement location on the electrode column, wherein the lowermost diameter measurement location is set by the machine vision system at a distance spaced from the bottom edge, and wherein the distance is less than a maximum diameter of the electrode column;
 determining a second pixel dimension of the tip diameter between opposite sides of the edge shape at the lowermost diameter measurement location using the machine vision system; and
 converting the second pixel dimension to a second physical dimension for the tip diameter of the electrode column.

12. A method for determining electrode consumption for each heat in an electric arc furnace, comprising the steps of:
 providing a nominal electrode diameter;
 measuring a red tip length of an electrode column in an electrode assembly using a machine vision system;
 determining a bottom edge of the electrode column using an edge detection algorithm running in the machine vision system, wherein the machine vision system is comprised of at least one of a smart camera with an integral processor and a digital camera in operative communication with the computer processor;
 defining a lowermost diameter measurement location on the electrode column, wherein the lowermost diameter measurement location is set by the machine vision system at a distance spaced from the bottom edge, and wherein the distance is less than a maximum diameter of the electrode column;
 measuring a tip diameter of the electrode column at the lowermost diameter measurement location using the machine vision system; and
 determining in the computer processor a modelled consumption amount of the electrode column using the measured red tip length, the measured tip diameter and the nominal electrode diameter.

13. The method of claim 12, further comprising the steps of:
 storing in a database a set of measured pressures associated with a set of weights for the electrode column for a set of heats, wherein the measured pressures are for a hydraulic actuator operating on the electrode column;
 correlating in the processor the set of measured pressures with the set of weights for the electrode column for the set of heats; and
 calculating in the computer processor a correlated consumption amount for the electrode column using a difference in the weights for a first heat and a second heat.

14. The method of claim 12, further comprising the steps of:
 determining an edge shape around a red tip section of the electrode column using the edge detection algorithm running in the machine vision system;
 measuring a plurality of additional diameters of the electrode column in the red tip section using the machine vision system, wherein the measurements for the additional diameters are taken at a set of locations spaced at intervals from the lowermost diameter measurement location; and
 defining a profile of the electrode column along the red tip section with the tip diameter and the additional diameters of the electrode column at the lowermost diameter measurement location and the set of locations for the measurements, respectively.

15. The method of claim 12, further comprising the steps of:
 setting a butt loss threshold based on an electrode column parameter, wherein the electrode column parameter is selected from the group of parameters consisting of a length of the electrode column, the red tip length of the electrode column, a pressure of a hydraulic actuator operating on the electrode column, and any combination thereof;
 measuring the electrode column parameter; and
 comparing in the computer processor at least one measurement of the electrode column parameter with the butt loss threshold to determine whether a butt loss has occurred.

16. A method for determining electrode consumption for each heat in an electric arc furnace, comprising the steps of:
 measuring a first length and a second length of an electrode column in an electrode assembly using a machine vision system during a first heat and a second heat, respectively, wherein the first heat and the second heat are consecutive heats of the electric arc furnace;
 determining a first edge shape and a second edge shape around a red tip section of the electrode column for the first heat and the second heat, respectively, using an edge detection algorithm running in the machine vision system, wherein the machine vision system is comprised of at least one of a smart camera with an integral processor and a digital camera in operative communication with the computer processor;
 determining a first bottom edge and a second bottom edge of the electrode column in the first edge shape and the second edge shape, respectively, using the machine vision system;
 defining a lowermost diameter measurement location on the electrode column, wherein the lowermost diameter measurement location is set by the machine vision system at a distance spaced from the first bottom edge in the first heat and from the second bottom edge in the second heat, and wherein the distance is less than a maximum diameter of the electrode column;
 determining a first tip diameter and a second tip diameter of the electrode column at the lowermost diameter measurement location using the machine vision system;
 determining in the computer processor a first state of consumption of the electrode column using the first length and the first tip diameter and a second state of consumption of the electrode column using the second length and the second tip diameter; and
 determining a consumption amount between the first heat and the second heat in the computer processor by the difference between the first state of consumption and the second state of consumption.

17. The method of claim 16, further comprising the steps of:

storing in a database a set of measured pressures associated with a set of weights for the electrode column for a set of heats, wherein the measured pressures are for a hydraulic actuator operating on the electrode column;

correlating in the processor the set of measured pressures with the set of weights for the electrode column for the set of heats; and calculating in the computer processor a correlated consumption amount for the electrode column using a difference in the weights for the first heat and the second heat.

18. The method of claim 16, further comprising the steps of:

determining a first set of additional diameters and a second set of additional diameters in the red tip section for the first heat and the second heat, respectively, wherein the machine vision system determines the first set of additional diameters and the second set of additional diameters at a set of locations spaced at intervals from the lowermost diameter measurement location; and defining a first profile and a second profile of the electrode column along a red tip length of the red tip section in the first heat and the second heat, respectively, wherein the first profile is comprised of the first tip diameter and the first set of additional diameters at the lowermost diameter measurement location and the set of locations for the first heat, and wherein the second profile is comprised of the second tip diameter and the second set of additional diameters at the lowermost diameter measurement location and the set of locations for the second heat.

19. The method of claim 16, further comprising the steps of:

setting a butt loss threshold based on an electrode column parameter, wherein the electrode column parameter is selected from the group of parameters consisting of a length of the electrode column, a red tip length of the electrode column, a pressure of a hydraulic actuator operating on the electrode column, and any combination thereof;

measuring the electrode column parameter for the first heat and for the second heat; and comparing in the computer processor at least one measurement of the electrode column parameter for at least one of the first heat and the second heat with the butt loss threshold to determine whether a butt loss has occurred in at least one of the first heat and the second heat.

\* \* \* \* \*